United States Patent Office 3,493,611
Patented Feb. 3, 1970

3,493,611
PREPARATION OF PERFLUOROACYL
FLUORIDES
Richard F. Sweeney, Randolph Township, Morris County, and Charles C. Yao, Parsippany, N.J., assignors to Allied Chemical Corporation, New York, N.Y., a corporation of New York
No Drawing. Filed Feb. 4, 1966, Ser. No. 525,143
Int. Cl. C07c 53/20, 53/36
U.S. Cl. 260—544   5 Claims

ABSTRACT OF THE DISCLOSURE

Perfluoroacyl fluorides are prepared by oxidizing perfluoroalkyl iodides, which contain the iodine in a terminal position, with sulfur trioxide in the presence of an antimony pentahalide catalyst selected from the group consisting of $SbCl_5$, $SbF_5$ or $SbF_3Cl_2$.

---

This invention relates to preparation of perfluoroacyl fluorides by oxidizing perfluoroalkyl iodides, which contain the iodine in a terminal position, with sulfur trioxide in the presence of an antimony pentahalide catalyst.

Perfluoroacyl fluorides having the formula:

(I) $\qquad R_fCOF$ wherein $R_f$ is a perfluoroalkyl group, are a well known class of chemical compounds which are known to be useful in the preparation of emulsions, surface coatings, surfactants and oleophobic and hydrophobic agents. For the purposes of this discussion and the claims, the term perfluoroalkyl refers to cyclic as well as to open-chain structures and also to branched chain as well as to straight chain structures.

Preparation of these compounds has been effected by a variety of means, e.g. electrochemical means and use of oleum to introduce oxygen functionality into perfluoroalkyl iodides. None of the prior art processes have been wholly satisfactory for one reason or another. Electrochemical production, for example, requires the use of elaborate and expensive equipment. Oleum oxidation results in formation of substantial amounts of carboxylic acid side products, thus considerably decreasing the yields of the acid fluoride obtainable.

It is well recognized in the art that, in spite of certain analogous behavior, fluorinated compounds differ substantially, in terms of reactivity and stability, from other correspondingly halogenated compounds. Generally it may be said that fluorinated compounds are less reactive than their halogenated, lesser fluorinated counterparts, i.e. the more fluorine present in the molecule, the less reactive will be the molecule. Thus a number of processes which have been developed and which are based upon the reactivity of polyhalogenated hydrocarbons, for example, are not applicable to starting materials which contain certain percentages of fluorine in the molecule. One such process is described in U.S. Patent 3,102,139 to Lawlor et al. which describes, inter alia, preparation of perhaloacyl fluorides containing at least one halogen atom other than fluorine by oxidation of perhaloalkyl halides containing at least two terminal halogen atoms other than fluorine with sulfur trioxide. Excluded from the scope of the process is the preparation of perfluoroacyl fluorides from the corresponding perfluoroalkyl halides. This is understandable since, for the reasons described above, starting materials containing so much fluorine are extremely stable and resistant to chemical reaction and, as the patent points out, are particularly resistant to oxidation reaction. The non-analogous behavior between the perfluoroalkyl iodide starting materials of the present invention, and perhaloalkyl halides, (including perhaloalkyl iodides) containing at least two terminal halogen atoms other than fluorine, is borne out by the fact that the patent reports that oxidation of the latter class of materials, included in the description of suitable starting materials therein, may take place over a wide range of conditions, e.g. room temperature, atmospheric pressure, or with or without the use of catalysts; whereas, no detectable amounts of perfluoroacyl fluorides are formed, for example, when the former class of materials, e.g. perfluoropropyl iodide or perfluoroheptyl iodide, is refluxed with sulfur trioxide for a period of at least 20 hours. Similarly, no detectable or appreciable amounts of perfluoroacyl fluoride are formed when perfluoropropyl iodide or perfluoroheptyl iodide is refluxed with sulfur trioxide for a period of at least 20 hours in the presence of such catalysts as aluminum trichloride, mercuric sulfate or mercurous sulfate.

After much experimentation, we have found that, under certain conditions, to be discussed more in detail hereafter, perfluoroacyl fluorides may in fact be readily prepared by sulfur trioxide oxidation of corresponding perfluoroalkyl halides, and at atmospheric pressure, provided that a narrow and specific class of perfluoroalkyl halides are employed as starting materials, viz perfluoroalkyl iodides containing the iodine in a terminal position, and further provided that the reaction is carried out in the presence of a highly critical and narrow class of catalysts, viz antimony pentahalide catalysts, e.g. antimony pentafluoride ($SbF_5$), antimony pentachloride ($SbCl_5$) and antimony trifluorodichloride ($SbF_3Cl_2$), to name a few. Mixtures of antimony pentahalides may also be employed. Thus, the invention consists essentially of the discovery of the combination of certain critical catalysts and critical starting materials, together with certain reaction conditions, which are required to make the sulfur trioxide route to perfluoroacyl fluorides feasible.

The suitable perfluoroalkyl iodide starting materials have the formula (II) $\qquad R_fCF_2I$ wherein $R_f$ is a perfluorinated alkyl group. Since there can be no acid fluoride of a ring compound with a cyclic carbon atom as the carbonylic carbon atom, $R_f$ groups which contain cyclic structures must have a perfluorinated alkylene bridge to link the same with the terminal iodine atom. We know of no limitation on the carbon content of the $R_f$ moiety except the practical one of availability of starting materials. For the latter reason, a desirable carbon content in the case of the open-chain compounds is from about 1–11 carbon atoms and preferably 2–9 carbons. The preferred carbon content for the cyclic aliphatic starting materials is from about 4–6 carbon atoms. It will be noted that the iodine atom is always in a terminal position. Mixtures of perfluoroalkyl iodide reactants may also be employed.

Illustrative starting materials suitable for use according to the invention process include the following: perfluoroethyl iodide, perfluoropropyl iodide, 2-trifluoromethylperfluoropropyl iodide, perfluorobutyl iodide, perfluorohexyl iodide, perfluoro(cyclobutylmethyl)iodide, perfluoro(cyclohexylmethyl)iodide, perfluorododecyl iodide.

The perfluoroalkyl iodide starting materials are commercially available and may be prepared by well known procedures.

The process of the invention is carried out by reacting a starting material, as defined by Formula II, with sulfur trioxide in the presence of the antimony pentahalide catalyst. Although the following detailed description will be made with particular reference to batch operation, it will be understood that the process is adaptable to continuous operation.

The reaction proceeds when trace amounts of catalyst are employed, say in the neighborhood of about 0.02 mole of catalyst per mole of perfluoroalkyl iodide starting material but in the interest of obtaining greater conversions of starting material within short reaction times, larger quantities of catalyst are desirable. A satisfactory operating range of catalyst concentration to perfluoroalkyl iodide is between about .3–1.5 moles of catalyst per mole of perfluoroalkyl iodide, with optimum conversions being obtained when the molar ratio of catalyst to starting material is about 1:1. No advantage accrues from the use of catalyst in substantial excess above the 1.5:1 ratio. The catalyst may be added all at once, in small portions, or continuously over the reaction period. For reasons of convenience, it is preferred to add the entire amount of catalyst at the beginning of the reaction.

The sulfur trioxide reagent may be added in any physical state but is preferably added in liquid form. Technical grade, stabilized, liquid sulfur trioxide, sold under the trade name of Sulfan, is convenient and is well suited for use.

Although the stoichiometry of the reaction would seem to require one mole of sulfur trioxide per mole of perfluoroalkyl iodide starting material, it has been found that an excess of sulfur trioxide, relative to the amount of perfluoroalkyl iodide starting material, must be employed. In this regard it appears that the sulfur trioxide serves as a solvent as well as a reactant. The antimony pentahalide appears to complex with the sulfur trioxide forming a solid material which precipitates out when the molar ratio of antimony pentahalide to sulfur trioxide becomes greater than about 1:5.3, at room temperature. As the ratio of antimony pentahalide to sulfur trioxide approaches 1:1, the sulfur trioxide/antimony pentahalide mixture becomes more and more solidified. When the ratio of antimony pentahalide to sulfur trioxide is less than about 1:5.3, at room temperature, the antimony pentahalide remains in solution. Since there will be obtained diminished conversions of perfluoroalkyl iodide to the corresponding acid fluoride when the molar ratio of antimony pentahalide to sulfur trioxide is greater than 1:5.3 at room temperature; it is preferred to operate with concentrations of sulfur trioxide greater than about 5.3:1 based upon the concentration of antimony pentahalide present. It will be seen that when the preferred .3–1:1 molar ratio of antimony pentahalide to perfluoroalkyl iodide starting material is employed, the preferred ratio of sulfur trioxide based upon the perfluoroalkyl iodide starting material will be from about 1.6– 5.8:1. No particular advantage accrues from the use of concentrations of sulfur trioxide in excess of the above indicated ranges.

The reaction temperature is not critical and may vary over a wide range, such as from about 0–110° C. For best results, the reaction should be run at the reflux temperature of the reaction mixture. Depending on the proportions of reactants present and upon the boiling point of the product, this will usually vary over a range of about 35–110° C.

One of the major features of the invention process is that it can be efficiently run at atmospheric pressures thus obviating the expense and inconvenience of operating high pressure equipment. If desired, however, superatmospheric or subatmospheric pressures may be employed. Elevated pressures will serve to diminish reaction times.

Reaction time for complete conversions is normally between 10–20 hours. Substantial amounts of product will, however, ordinarily be formed after about one half hour of reaction. End point of reaction may be determined by observing when the reflux temperature of the product mixture remains constant over a significant period of time.

The product perfluoroacyl fluoride may be separated from the product mixture by fractional distillation. If the corresponding perfluorocarboxylic acid is desired, the product mixture may be hydrolyzed in water or some appropriate aqueous acid, such as 10–60% and preferably 40–60% $H_2SO_4$, following which the perfluorocarboxylic acid may be recovered by extraction with a solvent, such as methylene chloride.

The following examples illustrate practice of the invention. Yields are in mole percent.

EXAMPLE 1

A mixture of 36.4 g. (0.123 mole) of perfluoropropyl iodide and 20.6 g. (0.257 mole) of Sulfan was charged to a 100 ml. three-necked flask equipped with a thermal well, dropping funnel, stirrer and a reflux condenser which condenser was connected to a Dry Ice-acetone cooled trap. The mixture was refluxed for a period of 41 hours. At the end of this period a small amount (3.1 g.) of condensate was present in the Dry Ice-acetone cooled trap. This was identified by infrared spectrographic analysis as being unreacted perfluoropropyl iodide. The flask contents were then cooled to room temperature and 1.5 g. of $SbF_5$ were added. The resulting mixture was refluxed for a period of 1½ hours. At the end of this period, 8.5 g. of condensate were found in the Dry Ice-acetone cooled trap. This condensate was shown by infrared and gas chromatographic analysis to consist of a mixture of 50% perfluoropropyl iodide and 50% perfluoropropionyl fluoride.

EXAMPLE 2

The apparatus employed include a 500 ml. round bottom three-necked flask equipped with a thermal well, dropping funnel, a stirrer and a reflux condenser. The reflux condenser was connected to a recovery train consisting of an ice water cooled trap, a Dry Ice-acetone cooled trap and a liquid nitrogen cooled trap. The reaction flask was charged with 149.2 g. (1.87 moles) of Sulfan and 103.8 g. (0.347 mole) of $SbCl_5$. 102.4 g. (0.346 mole) of perfluoropropyl iodide were then added slowly, with stirring. The resulting mixture was refluxed for 20 hours (reflux temperature about 70° C.). At the end of this period the contents of the traps were combined and were distilled through a three foot long fractionation column. The distillate consisted of 40.2 g. (0.242 mole) of perfluoropropionyl fluoride (B.P. —27° C.), 16.1 g. (0.251 mole) of sulfur trioxide and 22.4 g. (0.0757 mole) of perfluoropropyl iodide starting material (B.P. 39° C.). The conversion of perfluoropropyl iodide to perfluoropropionyl fluoride was 70%. The yield of perfluoropropionyl fluoride, based upon recovered perfluoropropyl iodide, was 90%. Identification of the fractions was made by infrared spectrographic analysis.

EXAMPLE 3

A mixture of 83.2 g. (0.168 mole) of perfluoroheptyl iodide, 30.4 g. (0.0380 mole) of Sulfan and 10 g. (0.033 mole) of $SbCl_5$ was charged to a 100 ml. three-necked flask equipped with a thermal well, dropping funnel, stirrer and a reflux condenser, which condenser was connected to a Dry Ice-acetone cooled trap. The reaction flask contents were refluxed (at amount 63° C.) for a period of about 16 hours. At the end of this period, the clear upper layer of the product mixture was decanted from the viscous tar layer at the bottom of the flask and was distilled to give a 79% yield and 35.5% conversion of perfluoroheptanoyl fluoride. Identification was made by infrared spectrographic analysis.

EXAMPLES 4–9

The procedure of Example 3 is repeated with the same molar proportions of reactants and catalyst, excepting that the perfluoroalkyl iodide starting material is varied, as indicated in the first column of following Table I, the catalyst is sometimes varied, as indicated in column 2 of the table and the corresponding acid fluoride varies, as indicated in column 3 of the table.

TABLE I

| Ex. | Starting Material | Catalyst | End Product |
|---|---|---|---|
| 4 | Perfluoroethyl iodide | SbCL₅ | Perfluoroacetyl fluoride. |
| 5 | 2-trifluoromethylper- fluoropropyl iodide. | SbCl₃F₂ | 2-trifluoromethylper- fluoropropionyl fluoride. |
| 6 | Perfluorohexyl iodide | SbCl₅+SbF₅ | Perfluorohexanoyl fluoride. |
| 7 | Perfluoro(cyclobutyl- methyl) iodide. | SbF₅ | Perfluorocyclobutane- carbonyl fluoride. |
| 8 | Perfluorocyclohexyl- methyl iodide. | SbCl₅ | Perfluorocyclohexane- carbonyl fluoride. |
| 9 | Perfluorododecyl iodide. | SbF₅ | Perfluorolauryl fluoride. |

Variations and modifications of the above description may be made without departing from the scope and spirit of the invention.

We claim:
1. The method of preparing compounds of the formula:

$$R_fCOF$$

wherein $R_f$ is a perfluoroalkyl group, which comprises reacting a compound of the formula:

$$R_fCF_2I$$

wherein $R_f$ is as defined above, with a stoichiometric excess of $SO_3$ in the presence of an antimony pentahalide, selected from the group consisting of $SbCl_5$, $SbF_5$ or $SbF_3Cl_2$.

2. The method according to claim 1 which is carried out at substantially atmospheric pressure.
3. The method according to claim 1 in which the $R_f$ group contains from 1–11 carbon atoms.
4. The method according to claim 3 in which the $R_fCF_2I$ compound is perfluoropropyl iodide.
5. The method according to claim 3 in which the $R_fCF_2I$ compound is perfluoroheptyl iodide.

References Cited
UNITED STATES PATENTS

| 3,351,644 | 11/1967 | Hauptschein et al. | 260—408 |
| 3,102,139 | 8/1963 | Lawlor et al. | 260—544 |
| 2,511,072 | 6/1950 | McCann | 23—174 |

LORRAINE A. WEINBERGER, Primary Examiner

E. J. GLEIMAN, Assistant Examiner

U.S. Cl. X.R.

260—408